United States Patent [19]

Straub, Jr.

[11] 4,393,487
[45] Jul. 12, 1983

[54] STYLUS CARTRIDGE

[75] Inventor: Paul J. Straub, Jr., Indianapolis, Ind.

[73] Assignee: RCA Corporation, New York, N.Y.

[21] Appl. No.: 328,550

[22] Filed: Dec. 7, 1981

[51] Int. Cl.³ .............................................. G11B 3/58
[52] U.S. Cl. ...................................... 369/74; 369/77; 369/120
[58] Field of Search ........................... 369/170, 74, 77

[56] References Cited

U.S. PATENT DOCUMENTS 4,173,348 11/1979 Dholakia ............................ 369/74

Primary Examiner—Steven L. Stephan
Attorney, Agent, or Firm—E. M. Whitacre; J. S. Tripoli; D. A. Kulkarni

[57] ABSTRACT

A stylus cartridge is equipped with a pair of integrally-molded flexural retaining fingers for locking a stylus arm within the confines of the cartridge body. When a slider member disposed on the cartridge is acted upon, it spreads the retaining fingers apart to release the stylus arm.

10 Claims, 15 Drawing Figures

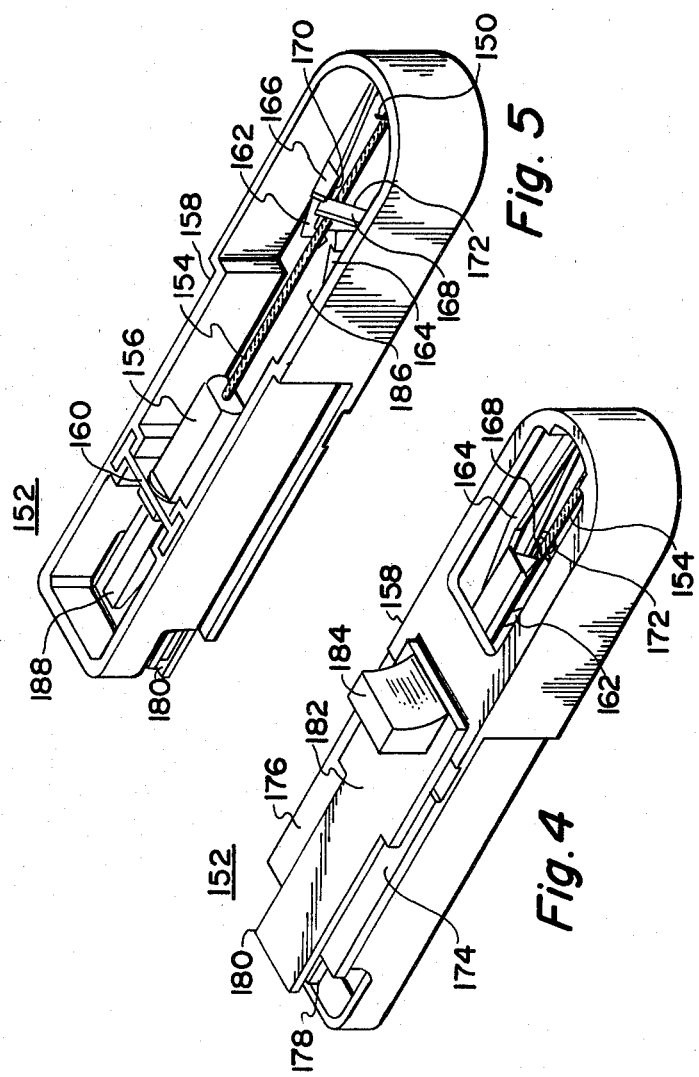

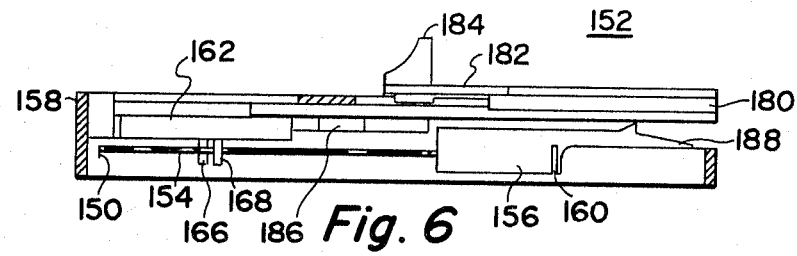
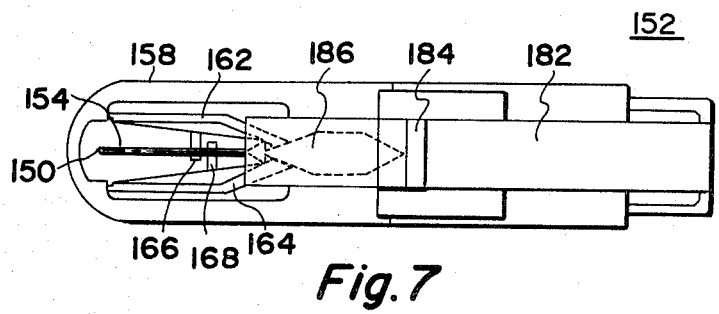
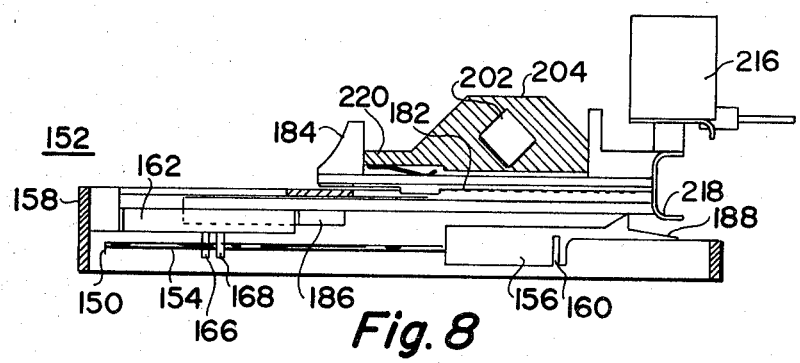
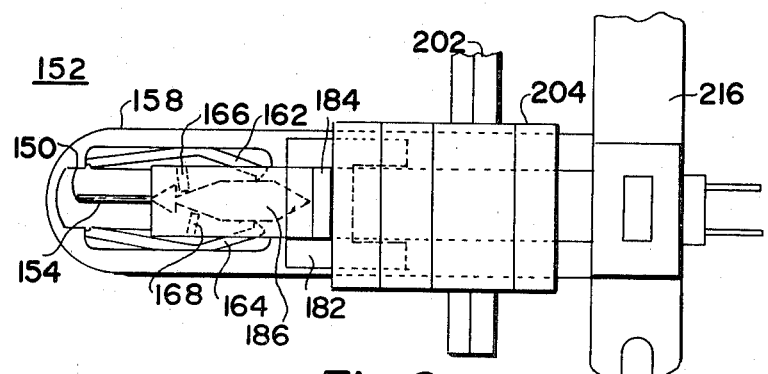

STYLUS CARTRIDGE

This invention relates to a video disc player, and more particularly, to a novel stylus cartridge for use in a video disc player.

In certain systems, picture and sound signals are stored on a video disc in the form of physical undulations in a continuous spiral track disposed on the disc surface. The video disc is placed on a turntable in a video disc player for playback. The variations in electrical capacitance between an electrode disposed in a disc-engaging pickup stylus and a conductive property of the disc are sensed during playback as the physical undulations on the disc surface pass beneath the stylus tip. The capacitive variations are converted into electrical signals for application to a conventional television receiver. A capacitance-type pickup system is illustratively disclosed in U.S. Pat. No. 3,842,194 (Clemens).

Because of the high information storage requirements of a video disc, the successive convolutions of the groove are closely spaced (e.g., groove width=2.5 micrometers), and the signal elements are small (e.g., signal element length=0.25 to 0.75 micrometers). The narrow dimensions of the video disc lead to a pickup stylus that has correspondingly small dimensions (e.g., stylus width=2 micrometers). The pickup stylus is typically housed in a cartridge. The pickup cartridge is installed in a translatable carriage disposed in the player. The carriage is driven radially during playback to follow the motion of the pickup stylus.

Because of the minuteness of the signal elements impressed on video discs, such records are sensitive to contamination. Dust, debris or foreign matter on the record could cause the pickup stylus to lift away from the record during playback, resulting in signal loss, or carrier distress, at the output of the pickup. To this end, the video disc is desirably enclosed in a caddy. The record player is fitted with a caddy extraction mechanism, which allows the video disc to be loaded into the player, and removed therefrom, without the need for touching the record.

Although the employment of a protective caddy reduces the accumulation of foreign matter on a video disc, the presence of dust and debris on the video disc cannot be entirely avoided. Besides, some comtamination is generated as the pickup stylus rides along the information track during playback. The contamination on the record can cause carrier distress during playback.

A partial alleviation of the carrier distress problem can be achieved by utilizing a preplay stylus having a shoe portion which engages the information track of the record prior to the actual playback. In a system such as the Clemens' system, the preplay stylus scrapes dust and debris particles off the groove walls and thereby effects a cleaning of the groove ahead of the pickup stylus.

In accordance with the present invention, a protective cartridge for a stylus is provided. The stylus is disposed at one end of a stylus arm. The other end of the stylus arm is yieldably supported in a cartridge housing. The cartridge housing is provided with a pair of integrally-molded compliant retaining fingers for supporting the stylus arm in a raised position within the confines of the cartridge housing. The cartridge housing is further equipped with a slidably mounted member. The slider member, when acted upon, streads the retaining fingers apart to release the stylus arm.

Pursuant to another feature of the invention, the retaining fingers are provided with respective inclined faces for supporting the stylus arm such that the yieldable support of the stylus arm is unstressed.

According to a further feature of the invention, a portion of the stylus arm near the supported-end thereof engages the slider member when it is retracted to cause the stylus arm to withdraw within the confines of the cartridge housing. The retraction of the slider member allows the retaining fingers to close, whereby the stylus arm is trapped within the cartridge.

Other features of the invention will become clear from the following detailed description of a preferred embodiment of the subject invention taken in conjunction with the accompanying drawings, wherein:

FIGS. 4 and 5 represent the perspective views of the subject preplay stylus cartridge, wherein FIG. 5 is an inverted isometric view of the preplay cartridge;

FIGS. 6 and 7 are, respectively, a sectional side view of a top view of the preplay cartridge of FIGS. 4 and 5;

FIGS. 8 to 11 depict the sequence of operations involved in the installation of the instant preplay cartridge in the video disc player of FIGS. 1 and 3.

Figure 1:
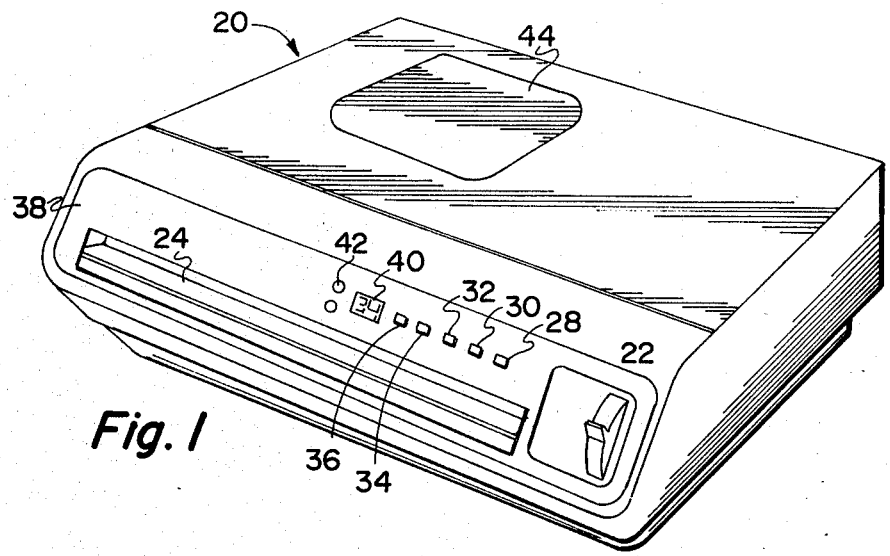
FIG. 1 is a video disc player incorporating the preplay stylus cartridge of the present invention.
Figure 2:
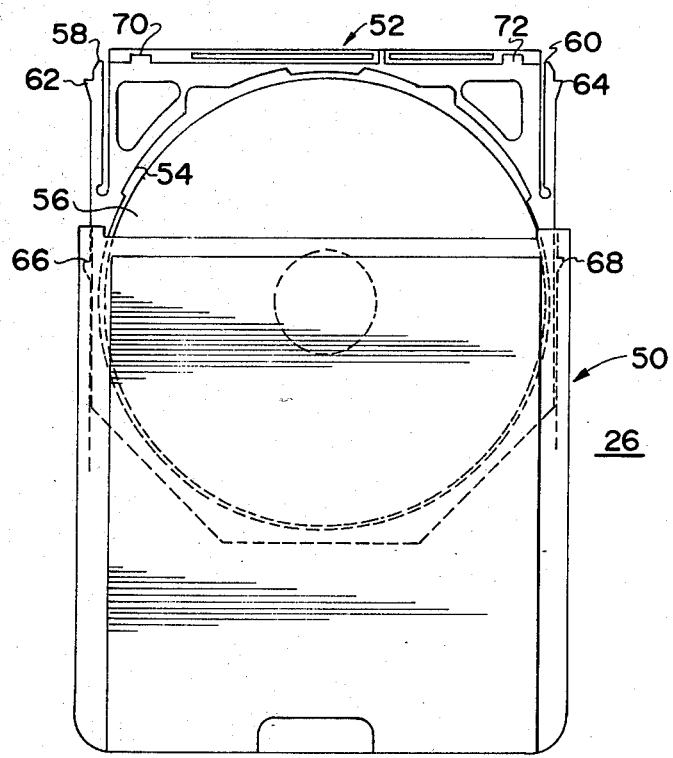
FIG. 2 shows a video disc caddy suitable for use with the player of FIG. 1.

Shown in FIG. 1 is a video disc player 20 employing the stylus cartridge of the present invention. A function lever 22 on the front side of the player is subject to disposition in any one of three positions-OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a video disc caddy 26, shown in FIG. 2, into the player to load an enclosed record therein. A pushbutton 28 is provided to dispose the player in the PAUSE mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four SEARCH modes, i.e., rapid access (forward/reverse) and visual search (forward/reverse), to permit the viewer to quickly locate a precise section of the prerecorded program. During rapid access, the pickup device is lifted, and rapidly moved sideways. In visual search, the pickup device is rapidly moved sideways while in engagement with the record. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., SIDE 1 and SIDE 2. A removable door 44 is disposed on the cover of the player to provide access to a pickup cartridge 46, illustrated in FIG. 3, so that it can be changed when required.

The video disc caddy 26 consists of a jacket 50 and a record retaining spine 52. The record retaining spine 52 has an opening 54 in which a record 56 is received. The record/spine assembly is, in turn, placed inside the jacket 50. The spine 52 is equipped with a pair of integrally-molded flexural locking fingers 58 and 60. The spine locking fingers 58 and 60 are fitted with protruding elements 62 and 64, which are received in pockets 66 and 68 disposed in the jacket 50 to lock the spine 52 in place. The spine 52 is further provided with cutouts 70 and 72 for selectively receiving respective spine gripper members mounted in the player to lock the spine therein to effect a record extraction in the manner subsequently explained.

Figure 3:
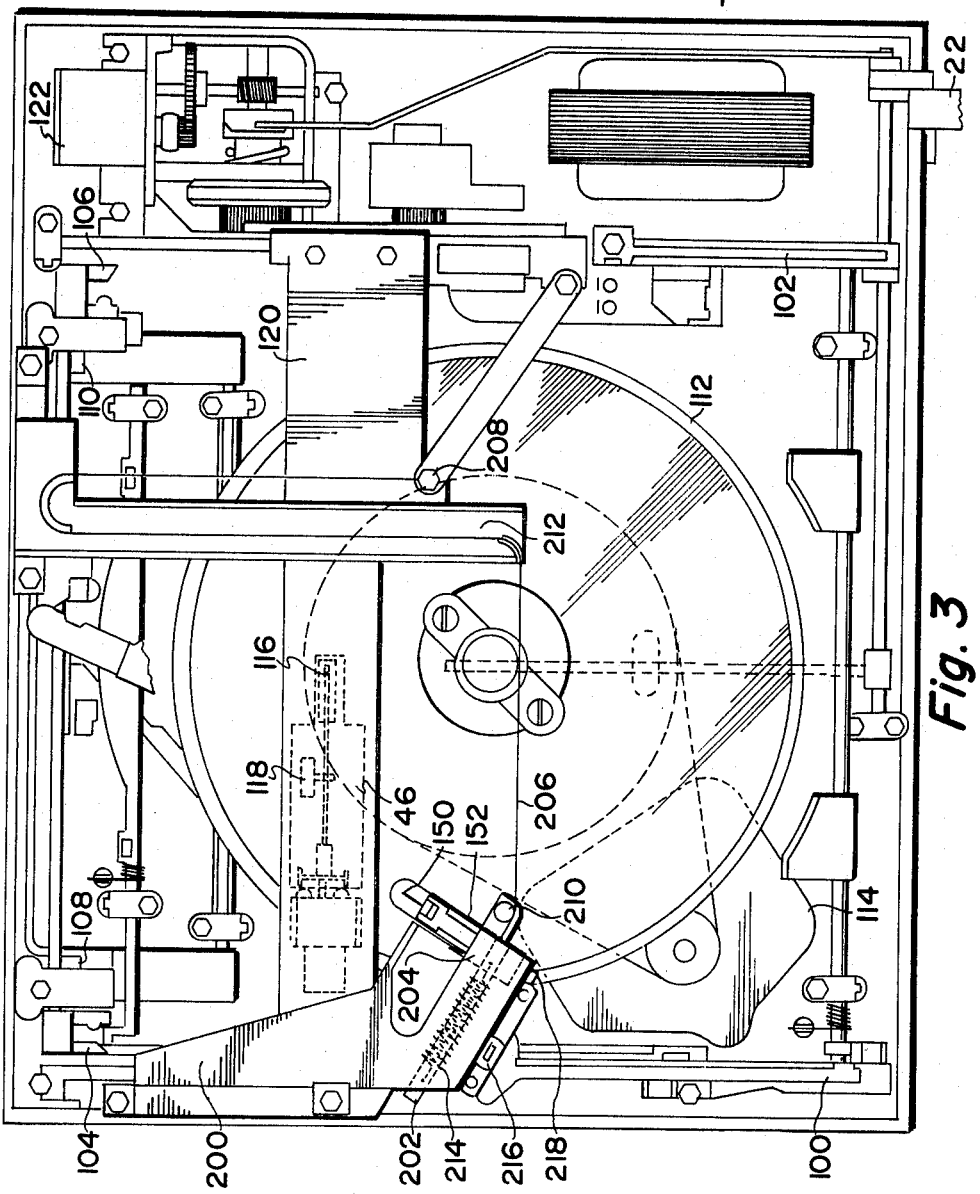
FIG. 3 illustrates a plan view of the video disc player of FIG. 1 with its cover removed to show the underlying details of the preplay cartridge mechanism.

To load a record into the player, a caddy 26 is inserted through the input slot 24 along a pair of guide rails 100 and 102 shown in FIG. 3. As the caddy arrives at a fully inserted position in the player, a pair of latch defeat members 104 and 106 enter the jacket 50 to defeat the spine latch fingers 58 and 60, thereby freeing the spine 52 from the jacket. Pivotally mounted in the player are spine gripper members 108 and 110 which engage the respective cutouts 70 and 72, arranged in the spine 52, to secure the spine to the player upon arrival of the caddy at the fully inserted position in the player. Subsequent withdrawal of the jacket 50 leaves the record/spine assembly inside the player resting on a set of receiving pads.

To transfer the retained record to a turntable 112, the function lever 22 is shifted from the LOAD/UNLOAD position to the PLAY position, which, in turn, raises the turntable and starts a turntable motor 114. A pickup stylus 116 is lowered on the record by a stylus lifter 118 for playback. U.S. Pat. No. 4,266,785, issued to Burrus, illustrates a suitable stylus lifter. The stylus 116 is housed in the pickup cartridge 46, which, in turn, is installed in a translatable carriage 120. A typical pickup cartridge is shown in U.S. Pat. No. 4,030,124, issued to Allen. The carriage 120 is driven by a carriage motor 122 such that it follows the radially inward motion of the pickup stylus 116. The carriage drive mechanism is of the type described in U.S. patent application, Ser. No. 193,060, filed for O'Connell et al., now U.S. Pat. No. 4,325,136. The recovered signals at the output of the pickup stylus 116 are transformed by signal processing circuits for application to a television receiver.

To retrieve the record, the function lever 22 is displaced to the LOAD/UNLOAD position, whereby the retained record is transferred back to the receiving pads. An empty jacket 50 is then reinserted into the player to recover the record/spine assembly. As the jacket 50 is guided into the player, the front edge thereof engages the carriage 120 to push it back to its starting position. The jacket 50 also serves to depress the spine gripper members 108 and 110 to free the spine 52 from the player. The caddy 26 is then extracted from the player. The record extraction mechanism is illustrated in U.S. Pat. No. 4,266,784, issued to Torrington.

As previously indicated, it is advantageous to employ a preplay stylus 150 to clean the dust and debris off the groove walls ahead of the pickup stylus, thereby reducing the possibility of carrier distress. The preplay cartridge 152, pursuant to this invention, will now be described in reference to FIGS. 4–7. FIGS. 4–7 are, respectively, a perspective view, an inverted perspective view, a sectional end view and a plan view of the preplay cartridge 152. The preplay stylus 150 is disposed at one end of a stylus arm 154. The other end of the stylus arm 154 is secured to a coupler 156. The coupler 156 is suspended in the cartridge housing 158 by means of a rubber diaphragm 160. The cartridge housing 158 is provided with a pair of integrally-molded flexural retaining fingers 162 and 164. The preplay cartridge 152 can be molded from any suitable plastic (e.g., Noryl). Disposed on the retaining fingers 162 and 164 are respective depending hook portions 166 and 168. The depending portions 166 and 168 are equipped with inclined faces 170 and 172 which support the stylus arm 154 within the body of the cartridge housing 158 such that the rubber diaphragm 160 is relaxed.

The cartridge housing 158 is fitted with a pair of guide rails 174 and 176 which are received in the respective channels 178 and 180 provided in a slider member 182 in a manner allowing to-and-fro motion of the slider. The slider 182 is equipped with a handle 184. Disposed on the underside of the slider 182 is a wedge-shaped cam portion 186 which serves to spread the retaining fingers 162 and 164 apart to free the stylus arm 154 when the slider is advanced. The coupler 156 is designed to have a weight which provides the appropriate tracking force to the preplay stylus 150 when it engages the information track of the record.

Disposed at the back of the coupler 156 is an extension 188 which is acted upon by the slider 182 when it is retracted to cause the stylus arm 154 to withdraw within the confines of the cartridge housing 158. The retraction of the slider 182 permits the retaining fingers 162 and 164 to close, whereby the stylus arm 154 is held in place in a raised position.

The preplay cartridge drive mechanism will now be explained in conjunction with FIG. 3. A bracket 200, fixedly mounted to the player, is fitted with a guide rod 202 for slidably supporting a trolley 204, which, in turn, houses the preplay cartridge 152. The preplay cartridge trolley 204 is provided with a pair of tracks for guiding the insertion of the preplay cartridge 152 into the trolley. A cable 206 has its one end secured to the trolley 204, and its other end is attached to an anchor 208 disposed on the pickup carriage 120. The cable 206 is guided along a path defined by a guide roller 210 and a guide member 212. As the carriage drive motor 122 drives the pickup carriage 120 during playback from a position at the rear of the player toward the front of the player, the cable 206 pulls the preplay cartridge trolley 204 from a position near the record periphery toward the record center. The preplay stylus 150 travels radially inward and ahead of the pickup stylus 116. As previously mentioned, the preplay stylus 150 cleans the grooves ahead of the pickup stylus 116 to reduce the possibility of loss of signal. A spring 214 serves to reset the trolley 204 to its starting position when the pickup carriage 120 is returned to the back of the player.

Mounted to the bracket 200 behind the trolley 204 is a stylus lifter 216 of the type earlier mentioned (U.S. Pat. No. 4,266,785). The stylus lifter 216 acts on a pivotally mounted frame 218, which, in turn, operates on the extension 188 secured to the stylus arm 154 at the back end thereof to selectively raise and lower the preplay stylus 150. The preplay stylus lifter mechanism is normally biased to dispose the preplay stylus 150 in the raised position. The preplay stylus 150 is lowered for record engagement with the preplay stylus lifter 216 is activated. The preplay stylus 150 is thus protected in the event of a power failure.

The installation of the preplay cartridge 152 in the video disc player will now be described with the help of FIGS. 8–11. As shown in FIGS. 8 and 9, the preplay cartridge 152 is inserted along the tracks disposed in the trolley 204. As the preplay cartridge 152 is guided into the trolley 204, its front edge 220 engages the handle 184 disposed on the slider 182 to automatically cause its advancement. When the slider 182 moves from the position shown in FIGS. 6 and 7 to the position shown in FIGS. 8 and 9, the wedge-like portion 186 disposed on the underside of the slider spreads the retaining fingers 162 and 164 apart to open the clamp hooks 166 and 168, thereby releasing the stylus arm 154. The preplay stylus 150 is, however, not allowed to fall on the record. The rear portion of the slider 182, in engagement with the extension 188, prevents the stylus arm 154 from rotating about its suspension 160 to confine the stylus arm within the cartridge body 158.

Figure 10:
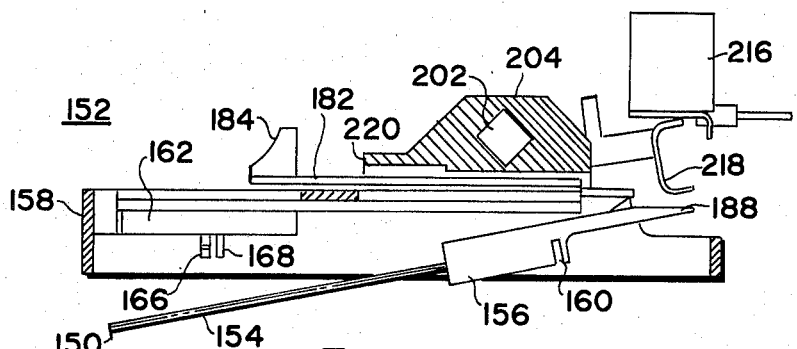
Figure 11:
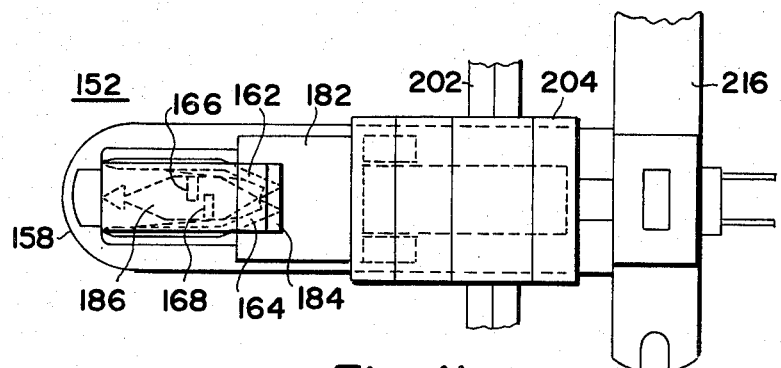

To lower the preplay stylus 150 on the record, the handle 184 on the slider 182 is manually shifted the remainder of its travel, and the stylus lifter 216 is energized in the manner illustrated in FIGS. 10 and 11. The preplay stylus 150 drops on the record under the weight of the stylus coupler 156. In this position of the slider 182, the flexural retaining fingers 162 and 164 are allowed to relax the strain in them.

Figure 12:
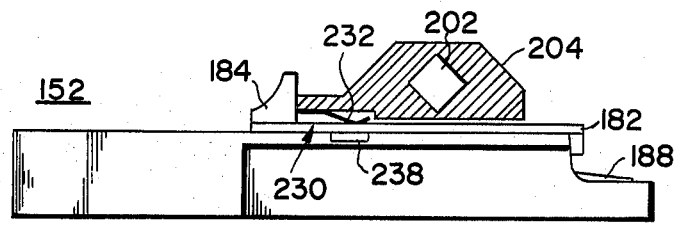
FIGS. 12 to 15 show the details of a mechanism for locking the subject preplay cartridge in the video disc player of FIGS. 1 and 3.
Figure 13:
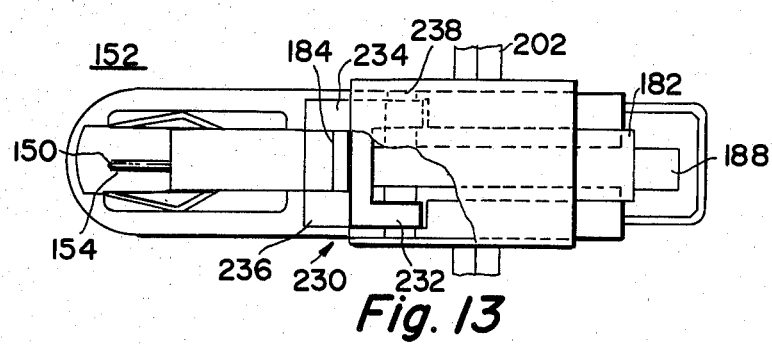
Figure 14:
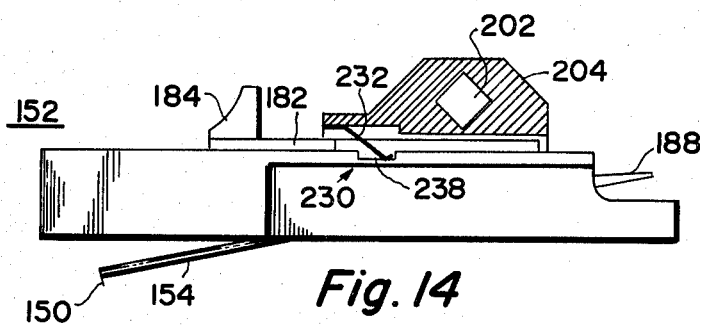
Figure 15:
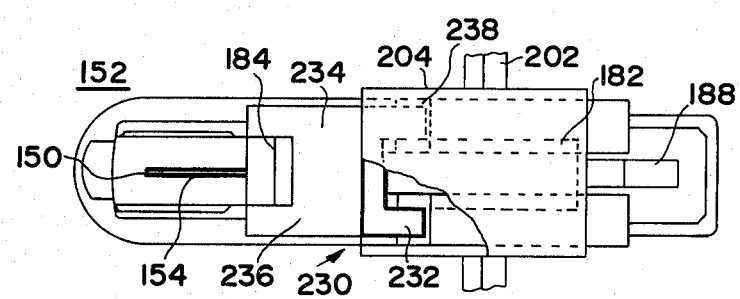

To prevent an inadvertent removal of the preplay cartridge 152 from the video disc player, a preplay cartridge locking mechanism 230, shown in greater detail in FIGS. 12-15, is provided. The locking mechanism 230 includes a bifurcated leaf spring 232 attached to the underside of the trolley 204. When the preplay cartridge 152 is initially inserted into the trolley 204, the shoulder portions 234 and 236 disposed on the slider 182 obstruct the free ends of the latching spring 232 from dropping into a transverse slot 238 provided in the top surface of the preplay cartridge as shown in FIGS. 12 and 13. When the slider 182 is manually moved to the position shown in FIGS. 14 and 15, the free ends of the leaf spring 232 fall into the locking slot 238 to securely clamp the preplay cartridge 152 in place. Movement of the slider 182 back to the location indicated in FIGS. 12 and 13 lifts the stylus arm 154 and unlocks the preplay cartridge 152 for subsequent withdrawal. This feature prevents a removal of the preplay cartridge 152 until the stylus 150 is retracted within the cartridge body.

Although the subject cartridge 152 is used for housing a preplay stylus 150 in this particular embodiment, it can also be used for housing a pickup stylus. In addition, although the specified embodiment of the present invention is described in a system which utilizes a groove record, it will be recognized that the claimed invention is useful in the context of stylus cartridges (preplay or playback) operating with information tracks on flat records.

What is claimed is:

1. A stylus cartridge comprising:
(A) a stylus;
(B) a stylus arm having said stylus disposed at one end thereof;
(C) a cartridge housing; said carriage housing being provided with a pair of guide rails;
(D) means for flexibly supporting the other end of said stylus arm in said cartridge housing;
(E) a retaining finger disposed in said cartridge for supporting said stylus arm in a raised position within the confines of said cartridge housing; and
(F) an actuating member slidably-mounted on said cartridge rails; said actuating member deflecting said retaining finger to release said stylus arm.

2. The cartridge as defined in claim 1 having a pair of oppositely-disposed flexural retaining fingers; said retaining fingers supporting said stylus arm in a raised position within the confines of said cartridge housing; said actuating member serving to spread said retaining fingers apart to free said stylus arm when said actuating member is acted upon.

3. The cartridge as defined in claim 2 wherein said flexural retaining fingers are integrally molded with said cartridge housing.

4. The cartridge as defined in claim 3 wherein each of said retaining fingers is equipped with a depending portion; each of said depending portions being provided with a slanting surface; said slanting surfaces centering said stylus arm within said cartridge.

5. A stylus cartridge comprising:
(A) a stylus;
(B) a stylus arm having said stylus disposed at one end thereof;
(C) a cartridge housing; said cartridge housing being provided with a pair of guide rails;
(D) means for flexibly supporting the other end of said stylus arm in said cartridge housing;
(E) a pair of oppositely-disposed, integrally-molded flexural retaining fingers for supporting said stylus arm in a raised position within the confines of said cartridge housing; each of said retaining fingers being equipped with a depending portion having a slanting surface; said slanting surfaces serving to center said stylus arm within said cartridge housing; and
(F) an actuating member slidably mounted on said cartridge guide rails; said actuating member being equipped with a wedge-shaped portion which engages said retaining fingers to spread them apart when said actuating member is advanced.

6. The cartridge as defined in claim 5 wherein said stylus arm is provided with an extension at said other end thereof which engages said actuating member when it is retracted to return said stylus arm to the confines of said cartridge housing.

7. The cartridge as defined in claim 6 wherein said stylus arm is fitted with a weight to provide a desired stylus tracking force.

8. The cartridge as defined in claim 7 for use with a record player having a stylus arm lifting/lowering mechanism; said actuating member being dimensioned such that when said actuating member is advanced to free said stylus arm, said extension of said stylus arm near said other end thereof is exposed through an opening in said cartridge housing for action by said stylus arm lifting/lowering mechanism.

9. The cartridge as defined in claim 8 for use with said player further having a slidably-mounted cradle; said cradle having a pair of guides for removably receiving said cartridge; said cartridge having a cutout in which the free end of a cradle-mounted latch spring is received for locking said cartridge in place when said actuating member is fully advanced; retraction of said actuating member defeating said latch spring to unlock said cartridge.

10. The cartridge as defined in claim 9 wherein the configuration of said actuating member is such that it obstructs entry of said latch spring into said cutout until said actuating member is fully advanced.

* * * * *